United States Patent
Lindquist et al.

[11] Patent Number: 5,953,662
[45] Date of Patent: Sep. 14, 1999

[54] DUAL HOME LOCATION REGISTERS IN A MOBILE RADIO SYSTEM

[75] Inventors: Jan Lindquist, Aachen, Germany; Simon Macdermott, Guildford, United Kingdom; Cuauhtémoc Medrano, Saltillo, Mexico; Gustavo Pavón, Plano, Tex.

[73] Assignee: Ericsson, Inc., Research Triangle Park, N.C.

[21] Appl. No.: 08/640,339

[22] Filed: Apr. 30, 1996

[51] Int. Cl.$^6$ .............. H04Q 7/22; H04Q 7/24; H04Q 7/36

[52] U.S. Cl. .............. 455/433; 455/432; 455/435; 455/437; 455/560

[58] Field of Search .............. 455/432, 433, 455/435, 437, 408, 414, 412, 406, 550, 555, 554, 560, 453, 436

[56] References Cited

U.S. PATENT DOCUMENTS

| | | | |
|---|---|---|---|
| 5,278,890 | 1/1994 | Beeson, Jr. et al. | 379/57 |
| 5,289,179 | 2/1994 | Beeson, Jr. et al. | 340/826 |
| 5,400,390 | 3/1995 | Salin | 379/59 |
| 5,457,736 | 10/1995 | Cain et al. | 379/60 |
| 5,479,481 | 12/1995 | Koivunen | 379/59 |
| 5,623,532 | 4/1997 | Houde et al. | 455/433 |
| 5,732,127 | 3/1998 | Hayes | 455/408 |
| 5,761,500 | 6/1998 | Gallant et al. | 455/433 |

FOREIGN PATENT DOCUMENTS

| | | |
|---|---|---|
| 95306209 | 6/1995 | European Pat. Off. . |
| PCT/SE94/ 00247 | 3/1993 | WIPO . |
| WO 93/25051 | 12/1993 | WIPO . |
| WO 94/23506 | 10/1994 | WIPO . |
| WO009428688A | 12/1994 | WIPO . |

*Primary Examiner*—Wellington Chin
*Assistant Examiner*—Keith Ferguson
*Attorney, Agent, or Firm*—Jenkens & Gilchrist, P.C.

[57] ABSTRACT

A pair of home location registers (HLRs) are associated with each other by assigning two capability codes. A first capability code is utilized to provide system support by one of the HLRs whenever the other HLR fails. The second capability code is utilized to constantly update each other's database with the latest subscriber information. Whenever a particular HLR fails, the associated Signal Transfer Points (STPs) reroutes the incoming signals intended for that failed HLR to its mate HLR. The mate HLR compares the received signals' destination point code with its first capability code to determine whether it is allowed to process this signal. If there is a match, the mate HLR automatically and transparently processes the received signal without service interruption or delay. Whenever one of the HLRs receives a new subscriber data, the same data are communicated to the other HLR by using its second capability code as the destination address.

36 Claims, 6 Drawing Sheets

DUAL HOME LOCATION REGISTERS IN A MOBILE RADIO SYSTEM

CROSS REFERENCE TO RELATED APPLICATION

This Application is related to a application for patent, Ser. No. 08/372,074, filed Jan. 12, 1995 now U.S. Pat. No. 5,623,532 issued Apr. 22, 1997.

BACKGROUND OF THE INVENTION

1. Technical Field of the Invention

The present invention relates to a mobile radio system and, in particular, to the duplication and communication of subscriber data among home location registers within a cellular telecommunications system.

2. Description of Related Art

A home location register (HLR) is a data base which serves mobile switching centers in a mobile telephone system. A mobile telephone system may comprise one or more such HLR units. Each HLR unit contains information regarding all the mobile telephone subscribers that belong to the geographic area that is covered by the mobile switching centers (MSC) connected to the HLR unit. For instance, this data base contains a record for each connected subscriber in the mentioned geographic area. Each such record further contains different types of subscriber information, for instance billing information, available subscriber feature services, etc. Such information is called the subscriber categories. Moreover, each record contains information on which MSC a particular subscriber is currently associated. This location information is required to enable redirection of incoming calls intended for that subscriber to the MSC in the coverage area of which the subscriber is currently located.

Whenever an incoming call is received for a particular subscriber or the subscriber moves into a different MSC coverage area, the corresponding HLR needs to be updated and queried to properly process the call. Consequently, if a particular HLR should fail or restart, all associated subscribers for that HLR would be without telecommunications service. Accordingly, maintaining the integrity and reliability of the HLRs and the data stored therein is essential for proper operation of a cellular telecommunications system.

Typically, when a particular HLR fails or restarts, back-up information is retrieved from an auxiliary storage medium and loaded onto the failed HLR to replace and correct the corrupted data. However, there exists data which might not be replaceable by the auxiliary storage medium. For example, that information which changes constantly cannot be stored permanently in a backup database. Such information includes the roaming locations of some of the subscribers. When that kind of data is lost due to an HLR failure, it needs to be retrieved or reproduced within the telecommunications network.

One method of replacing such information is to inform all visitor location registers (VLR) that this particular HLR has failed and that the failed HLR needs to be updated with new location data for subscribers that are roaming in each VLR coverage area. An example of such an operation is the "Reset" operation which is signaled over the Signaling System No. 7 (SS7) network (Unreliable Roamer Data Directive in IS-41). Such procedures, however, take time and further strain the telecommunications network as the failed HLR and the system are trying to recover from the fault. In the meantime, mobile subscribers remain without telephone service and some of the important subscriber data are also permanently lost.

A number of systems have been developed to alleviate the above problems. One such system updates the backup database much more frequently to reduce the amount of data that are lost when an HLR fails. Even though such a system might reduce the data loss, the failed HLR still has to be restarted and mobile subscribers are still without telecommunications service until the HLR recovers. Another system discloses dual HLR databases to replace and support each other when one of the two fails. The data stored in one HLR is mirrored by the other. Whenever one of the two HLRs fails, the other surviving HLR automatically takes over the functionality of the failed HLR and provides service in real time to the subscribers associated with the failed HLR. Accordingly, the failure of one of the HLRs is unnoticed by the associated subscribers and no telecommunications service is disrupted. However, such a system often requires a direct communication link between the two HLRs to communicate data and to control the operation of each other. Because of such physical connection requirements, the two HLRs have to be located in the proximity of each other. Additionally, a separate communication link and its interface module need to be established within each HLR.

An application for patent related to this application and filed Jan. 12, 1995, Ser. No. 08/372,074 (hereinafter referred to as the '074 application) discloses a system where two HLRs support each other via a SS7 telecommunications network without the need for additional links or interface modules between the two mated HLRs. However, the system disclosed in the '074 application has certain system limitations. The two HLRs, as disclosed in the '074 application, need to be connected through the same two Signal Transfer Points (STPs). Each node in a SS7 telecommunications network is supported by dual STPs. In case the first STP or links between the first STP and the destination node fails, the second STP is utilized to provide reliable network operation. The system as disclosed in the '074 application requires that the two HLRs providing support for each other be connected to the same two STPs. This implies that the two HLRs have to be physically limited within the same geographic region. Instead of associating with a most suitable HLR anywhere in the SS7 network, two HLRs within the same region are used to support each other. If one of the HLRs has no database space or processor time, because of such restrictions, the data support is not possible.

Also, the '074 application does not specify an addressing or signaling scheme for instructing a slave HLR to recognize rerouted signals intended for a failed master HLR. Without such addressing or signaling scheme to allow the slave HLR to recognize and accept the rerouted signals, the slave HLR will fail to recognize signals rerouted to the slave HLR as correctly delivered signals. This is because the Signal Point Codes (SPC) within the rerouted signals do not correspond with the SPC for the slave HLR.

Another concern with the '074 application relates to addressing when a master HLR communicates data to its slave HLR. If the master HLR transmits a signal toward the slave HLR, and if the slave HLR has failed or is unreachable, the signals are automatically rerouted back to the master HLR by the system STPs. In other words, the network cannot, without a specific addressing scheme, currently distinguish signals communicated between the two HLRs and signals received from other nodes over the network. As a result, if a HLR fails, the '074 system always reroutes the signals to the slave HLR of the failed HLR. In this particular case, that slave HLR is the original HLR who has initially generated the rerouted signal. By returning the same signal to the original HLR, if the data contents of the original HLR have changed in interim, the data integrity of the original HLR will be inadvertently destroyed.

Accordingly, it would be advantageous to enable two HLRs located anywhere within the Signaling System No. 7 (SS7) telecommunications network to support each other in real time without requiring additional communications links between the two and without destroying the integrity of the data base.

SUMMARY OF THE INVENTION

The present invention provides a method and apparatus for providing backup support for a home location register (HLR) within a cellular telecommunications system. Data stored in a first HLR are duplicated by a second HLR connected to a Signaling System No. 7 (SS7) telecommunications network. Should the first HLR fail, signals intended for the first HLR are rerouted to the second HLR. Each HLR contains two different Capability Codes. The second HLR compares one of its Capability Codes with the Signal Point Code of the destination address associated with the rerouted signals and determines whether it is compatible to support the failed HLR's signals and accordingly processes the rerouted signals.

Whenever the first HLR receives a signal to update the contents of its data base, the first HLR transmits the same data to the second HLR using another one of its Capability Codes. The actual transmission is achieved over the same SS7 telecommunications network utilizing the same Signal Transfer Points (STPs). By utilizing a different Capability Code for duplicating subscriber data, in case the second HLR fails, the signals transmitted by the first HLR are not rerouted back to the first HLR. This prevents inadvertent destruction of the integrity of the data within the first HLR.

In one aspect, the present invention provides a system for duplicating subscriber information within dual HLRs for reliably providing cellular telecommunications service to a plurality of subscribers.

In another aspect, the present invention provides a system for duplicating subscriber information in two HLRs connected via the Signaling System No. 7 (SS7) telecommunications network.

In yet another aspect, the present invention provides a system for communicating subscriber data from a first HLR to a second HLR via the same SS7 telecommunications network.

In a further aspect, the present invention provides a system comprising a first capability code and a second compatibility code for supporting and communicating data between the first HLR and the second HLR.

In a still further aspect, the present invention provides a method for determining the priority of routing signals among the first and the second HLRs.

In a still further aspect, the present invention provides a method for communicating subscriber data between the first HLR and the second HLR.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
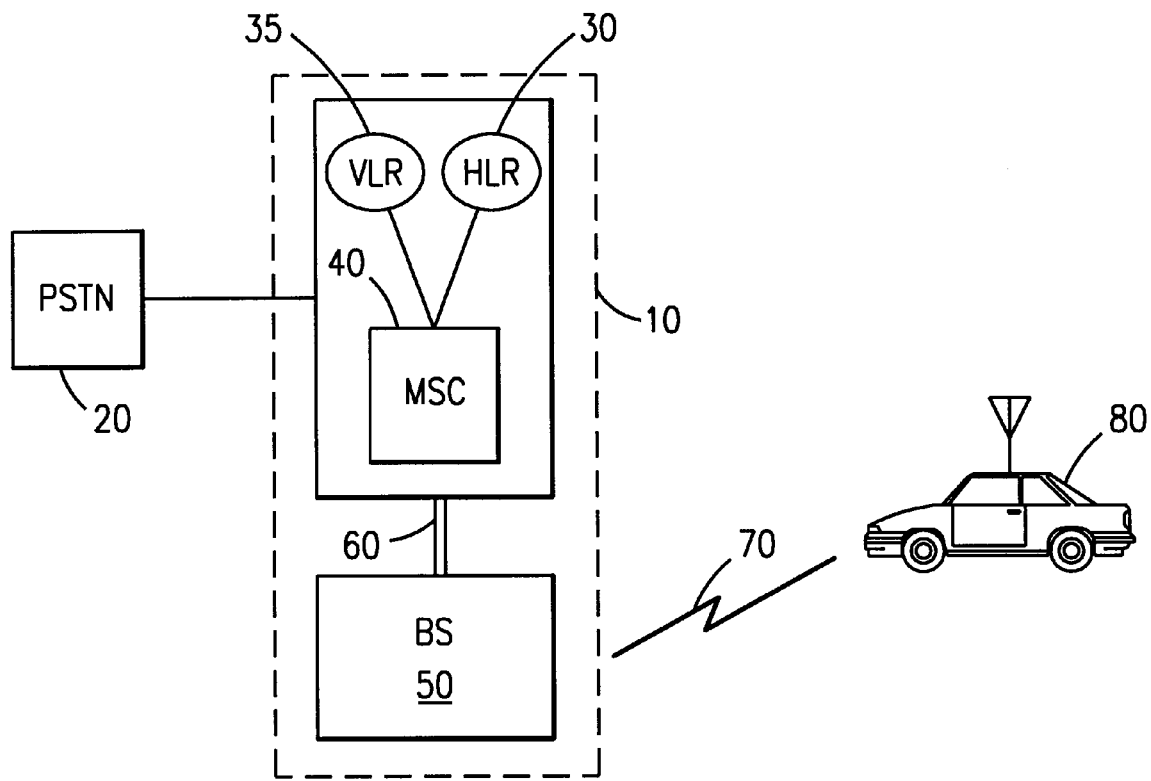
FIG. 1 is a diagram illustrating a public land mobile network (PLMN) interfacing with a mobile station (MS) and a public switch telephone network (PSTN)

FIG. 1 shows a public land mobile network (PLMN) 10 in which the present invention, as will be disclosed herein, may be implemented. The PLMN 10, which is used to communicate with a mobile user, comprises a Mobile Switching Center (MSC) 40, a home location register (HLR) 30, a visiting location register (VLR) 35, a base station (BS) 50, and a mobile station (MS) 80. The PLMN 10 is interfaced with a public switched telephone network (PSTN) 20 to provide a communication link to other telephone subscribers. The BS 50 is connected to the MSC 40 using a digital or analog communication link 60, and communicates with a mobile station 80 via a radio channel 70. The HLR 30 is a data base containing information about all "home" subscribers, their services and location. In large networks with high subscriber densities, HLRs 30 are separate nodes. In small networks, they can be integrated in the MSC 40 as shown in FIG. 1. The BS 50 provides the communication link with a mobile station 80 when the mobile station is within the coverage area of the BS known as a cell. The MSC 40, which contains the mobile station's subscription, is known as the "home MSC." If the subscriber crosses the border to another MSC area during a conversation, an interexchange handoff will take place and the adjacent MSC, known as a "visited MSC," then handles the conversation— this process is known as "handoff." Furthermore, if the mobile station 80 moves to another MSC area and tries to use its telecommunications service, the newly visited MSC notifies the home HLR 30 and requests confirmation data, and accordingly provides the telecommunications service to the visiting mobile station 80—this process is known as "roaming."

A call from the mobile subscriber starts when the mobile subscriber first keys in the desired destination number and then presses the send button. If the mobile subscriber is within its home switch coverage area, an access channel is seized, whereupon the mobile identity and the desired number are automatically transmitted to the MSC 40 via the BS 50. The MSC 40 analyzes the calling subscriber's category retrieved from the HLR 30 to verify that the caller is permitted access to the system. The keyed destination number is also analyzed to determine if the caller is allowed to call that particular number. If all analyses are affirmative, the mobile subscriber is assigned to an analog or digital voice channel 70 and the call is set up.

On the other hand, if the mobile subscriber is outside of his own MSC coverage area and is roaming in a new MSC area, the mobile station automatically registers with the new MSC controlling the current area when the cellular unit is turned on. The visited MSC checks whether this mobile station is already registered. If not, the visited MSC informs the home MSC 40 or HLR 30 about the new position of the mobile station. The home MSC 40 notes in which service area the mobile station is roaming to be able to reroute all incoming calls to the new MSC. The roaming subscriber may now originate and receive calls in the same manner as that used in the home MSC. All special services (call transfer, call waiting, etc.) also automatically follow the roamer.

Accordingly, whenever a call is processed for a particular mobile subscriber or the subscriber moves into a different MSC coverage area, the home HLR needs to be updated and queried to properly process the call. Consequently, the integrity and reliability of HLRs containing the necessary subscriber category information are essential for proper operation of a cellular telecommunications system. Whenever a particular HLR fails or restarts, all associated mobile subscribers are without telecommunications service. Some of the dynamic memory contents may also be permanently lost since incomplete back-up data have to be loaded from the auxiliary device overriding the existing data within the failed HLR. Therefore, it would be advantageous to provide telecommunications service to mobile subscribers without service interruption or data loss whenever HLRs fail.

With the advent of digital switching, Common Channel Signaling (CCS) has rapidly become the preferred way of handling the connection of calls in circuit-switched networks. The objectives of CCS are to provide significant improvements in call connect time and considerably increased signaling capacity. These are made possible by modern digital techniques, the widespread use of computer controlled digital systems and by the availability of wideband transmission facilities. The most commonly used technology for implementing CCS in the U.S. has been the Signaling System No. 7 (SS7) initially created by the Consultative Committee on International Telephone & Telegraph (CCITT).

Figure 2:
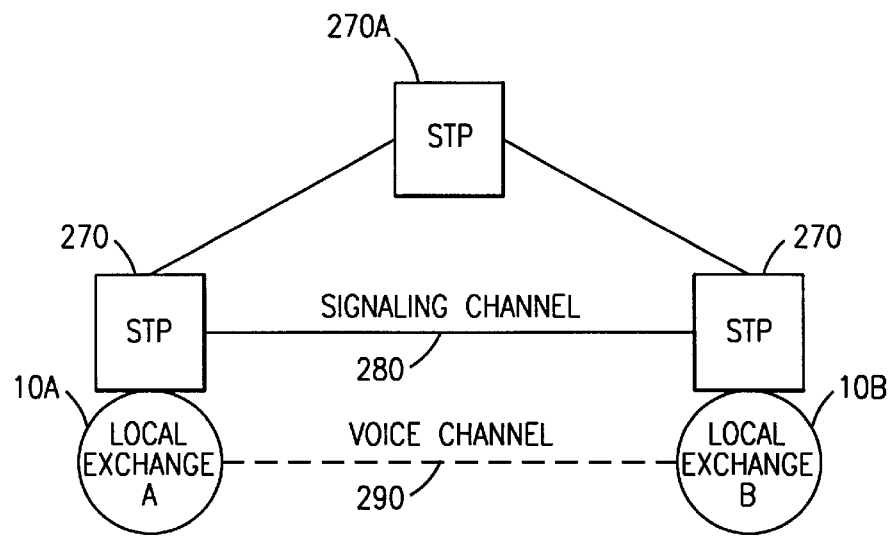
FIG. 2 is a block diagram of a section of a Signaling System No. 7 (SS7) telecommunications network.

FIG. 2 is a diagram representing a section of a typical Signaling System No. 7 telecommunications network in which the present invention, as will be disclosed herein, may be implemented. To carry out the routing and signaling function, messages must be sent via the packet-switched signaling network from a local exchange A 10A to a local exchange B 10B. Signal Transfer Points (STPs) 270 either located at an exchange or geographically separate therefrom, are designed to provide for the generation and transfer of signaling messages. One signaling channel 280 is shown associated with two local exchanges 10A and 10B. A voice channel 290 allowing "conversation" between the two exchanges is separately represented as shown in dotted lines. Messages involving the use of trunks (channels) that connect these two exchanges are in this case transmitted directly between them. However, signals relating to the local exchange A 10A and the local exchange B 10B may also be transferred via an intermediate STP 270A, as shown. This mode of operation is called a nonassociated one. Both modes of operation have been defined in SS7 and as a result provide great robustness and reliability since the failure of one link will not affect the overall performance.

Figure 3:
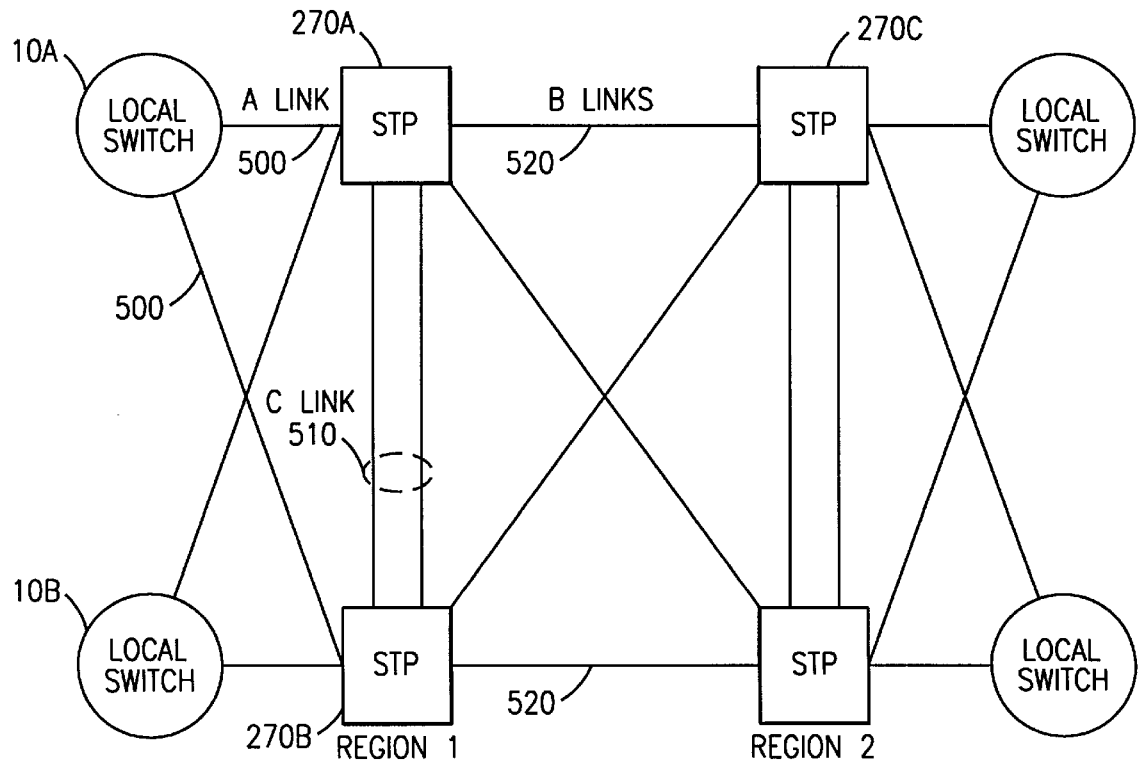
FIG. 3 is a diagram illustrating the architectural hierarchy of the Common Channel Signaling (CCS)-SS7 telecommunications network.

Now referring to FIG. 3, the CCS-SS7 network as shown is fully connected for reliability and robustness. The United States, for example, is divided into 10 regions and each of the 10 regions has two interconnected duplicated STPs 270A and 270B. The regional STP 270A is augmented by the area STP 270B for reliability. The A-links 500 provide access to the network from a node such as a local switch 10A where the local switch 10A is also connected to both STPs 270A and 270B for reliability. The STPs such as 270A and 270C in the network are themselves interconnected by so called B-links 520, while duplicate STPs in one given region are connected by C-links 510.

The hierarchy of the CCS-SS7 architecture allows the addition of a new node or switch to the network with minor adjustments, and because each region is supported by two STPs and two A-links and B-links, it provides great reliability and robustness. If an STP or a link goes down, the network will automatically reroute the data to the other STP or link and maintain its network reliability automatically.

Typically, HLRS are separately connected nodes within the above SS7 telecommunications network. Each HLR serves a group of mobile subscribers by storing the necessary subscriber category information regarding those subscribers and by furnishing the requested information over the network each time a call is processed for any one of those subscribers. Consequently, a failure of a particular HLR implies that all associated mobile subscribers for that particular HLR are without telecommunications service.

Figure 4:
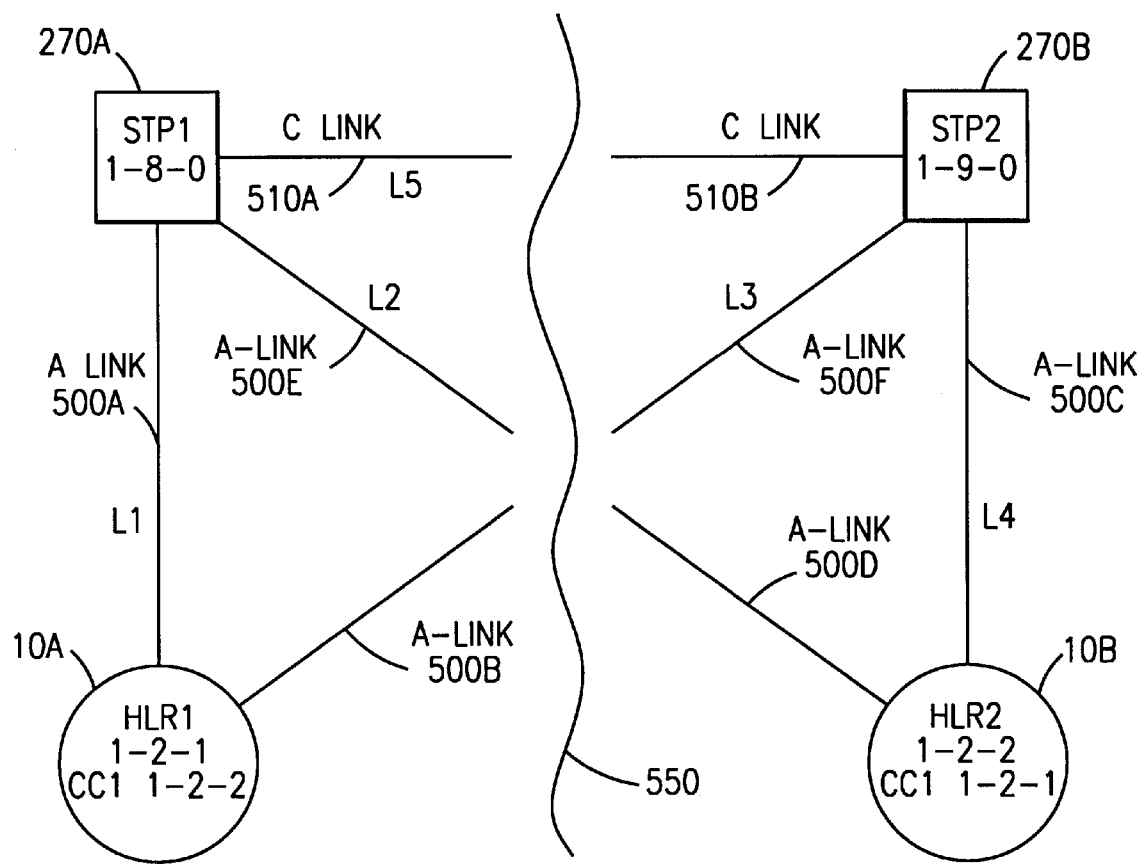
FIG. 4 is a block diagram of dual home location registers (HLRs) providing support for each other.

FIG. 4 is a block diagram of a pair of HLRs providing subscriber data support for each other. In accordance with the teachings of the present invention, two separate HLRs serving two different groups of subscribers are associated with each other to duplicate each other's subscriber data. As one HLR is being updated with new subscriber data, the same data is also transmitted to the mate HLR to also update its database. By mirroring each other's data, in case one HLR fails, the other HLR can immediately replace the failed one and provide system support without service interruption to the subscribers associated with the failed HLR.

As an exemplary embodiment of the present invention, the HLR1 10A and the HLR2 10B are shown connected to the SS7 telecommunications network. The HLR1 10A is supported by the STP1 270A, and the HLR2 10B is supported by the STP2 270B. The HLR1 10A is connected to the first of its STPs 270A via the A-link L1 500A. As described above, the HLR 10A is further connected to its second STP (not shown) via a link 500B. The STP1 270A is also connected to its neighboring STP (not shown) via the C-link L5 510A. Another HLR (not shown) within the same region is also connected to the STP1 270A via the A-link L2 500E. The HLR2 10B located elsewhere in the SS7 network is also connected to the first of its STPs 270B via the A-link L4 500C. As required, the HLR2 is also connected to one additional STP (not shown) via the A-link 500D for reliability. The STP2 270B supporting the HLR2 10B is also connected to its neighboring HLR (not shown) via the C-link 510B. STP2 also supports another node (not shown) by providing a linkage via the A-link L3 500F. Even though these two HLRs are remotely located from each other, by utilizing the existing SS7 network in accordance with the teachings of the present invention, signals are automatically rerouted to the other HLR and data are transparently communicated amongst each other duplicating and maintaining the integrity of the data base.

Even though HLR1 and HLR2 can be any nodes within the SS7 telecommunications network being supported by any pair of STPs as illustrated by the network divider 550 in FIG. 4, for exemplary purposes, two adjacent STPs within the same geographical region are used to illustrate the routing supported by a pair of STPs.

Each node within the SS7 telecommunications network, including STPs, has a signaling point code (SPC). A specific SPC is used to represent a particular node within the network. Therefore, an SPC is used to deliver packets from one point to another using the specified SPC as the destination address. As shown in FIG. 4, the STP1 270A is assigned the SPC value of 1-8-0. The STP2 270B is assigned the SPC value of 1-9-0. The HLR1 10A is assigned the SPC value of 1-2-1 and the HLR2 10B is assigned the SPC value of 1-2-2. Signals intended for HLRs are first received by the associated STPs and appropriately transmitted to the correct destination using an address translation table. Typically, each node within the SS7 telecommunications network has only one SPC. However, for purposes of the present invention, the network needs to reroute signals to the mate HLR in case the intended HLR has failed. Therefore, additional SPCs are required to alternatively handle fault situations.

In accordance with the teachings of the present invention, the HLRs have two additional SPC codes called capability codes. The capability code #1 (CC1) within each HLR represents the SPC value of its assigned mate HLR. As mentioned previously, each HLR has a mate HLR duplicating each other's data and supporting each other in case of system failure. For example, the HLR1 10A contains a CC1 value of 1-2-2 which represents the SPC value for the HLR2 10B who is the mate HLR for the HLR1 10A. Similarly, the HLR2 10B has a CC1 value of 1-2-1 which represents the SPC value for the HLR1 10A who is the mate HLR for the HLR2 10B. As a result, by cross-referencing each other's SPC values, the HLR1 10A and the HLR2 10B are correlated as mates and support each other's signaling in case of the other's failure.

If the HLR1 10A fails, all incoming signals intended for the HLR1 10A are rerouted to the HLR2 10B. After receiving the signals, the HLR2 10B, by comparing its CC1 value with the received destination address, determines whether it is compatible to handle the received signals. If they match, the mate HLR appropriately processes the received signals. As an example, when an incoming signal is received for a particular HLR, it is first routed to an STP servicing the geographic area covering the destination HLR. The STP associated with the destination HLR then accordingly attempts to deliver the signal to the destination HLR by referencing an address table. If the destination HLR is inoperable, the SS7 network via the STP automatically reroutes the signal to the mate HLR in order to continuously provide telecommunications service to mobile subscribers.

Accordingly, the dual STPs assigned to a pair of HLRs contain an address translation table, as shown illustratively below, to properly reroute the signals if any one of the HLRs or their connecting links fails:

TABLE 1

| Node | Dest | Priority | LS | Route |
| --- | --- | --- | --- | --- |
| STP1 1-8-0 | 1-2-1 | 1 | L1 | 1-2-1 |
|  |  | 2 | L5 | 1-9-0 |
|  | 1-2-2 | 1 | L2 | 1-2-2 |
|  |  | 2 | L1 | 1-2-1 |
| STP2 1-9-0 | 1-2-1 | 1 | L3 | 1-2-1 |
|  |  | 2 | L4 | 1-2-2 |
|  | 1-2-2 | 1 | L4 | 1-2-2 |
|  |  | 2 | L5 | 1-8-0 |

The Node column of Table 1 represents the node receiving the incoming signals. Therefore, if STP1 has to initially receive incoming signals for HLR1, the first row of the Node Column in Table 1 is referenced to properly route the signals to HLR1. The destination (Dest) column specifies the SPC of the destination node for the received incoming signals. Such a destination has two different prioritized links. For the STP1 1-8-0, incoming signals intended for the SPC 1-2-1 (HLR1 10A as shown in FIG. 4 and the first row in the Dest column in Table 1) have 2 different prioritized links. Therefore the Priority column specifies the priority order for the corresponding links specified in the Link Set (LS) column of Table 1. If the link specified by the first priority entry is inoperable, the second priority link is utilized. If the first priority link is operable, the final destination node as reflected by the Route column corresponds to the corresponding entry in the Dest column. However, if the second priority link is used, a different SPC is reflected in the Route column. This is because the intended node cannot be reached and an alternative node has been selected to reroute the signal.

Similarly, the second row in the Dest column instructs which links to use for signals intended for the destination node 1-2-2. Likewise, the second row in the Node column represents signals received by STP2 and how they should be routed depending on the destination SPC codes and available links.

Now referring again to FIG. 4, each HLR is connected via dual links to two different STPs for reliability and robustness. If a link connecting a particular HLR to its associated STP fails disabling the STP from sending a received signal to the HLR, instead of immediately sending the signal to the mate HLR, the STP reroutes the received signal to the other STP supporting that particular HLR. Therefore, the first priority link in Table 1 for each STP reflects a link to the intended HLR. The second priority link on the other hand reflects a link to the other STP serving the same intended STP. The second STP then again attempts to route the signal to the intended HLR. If this also fails, then the second STP reroutes the signal to the mate HLR for system support. Therefore, the system tries to exhaust all its possible links to the intended HLR before rerouting signals to the failed HLR's mate. This is to ensure that the originally intended HLR receives and processes the incoming signals unless the HLR itself or all the connecting links have failed.

Figure 5:
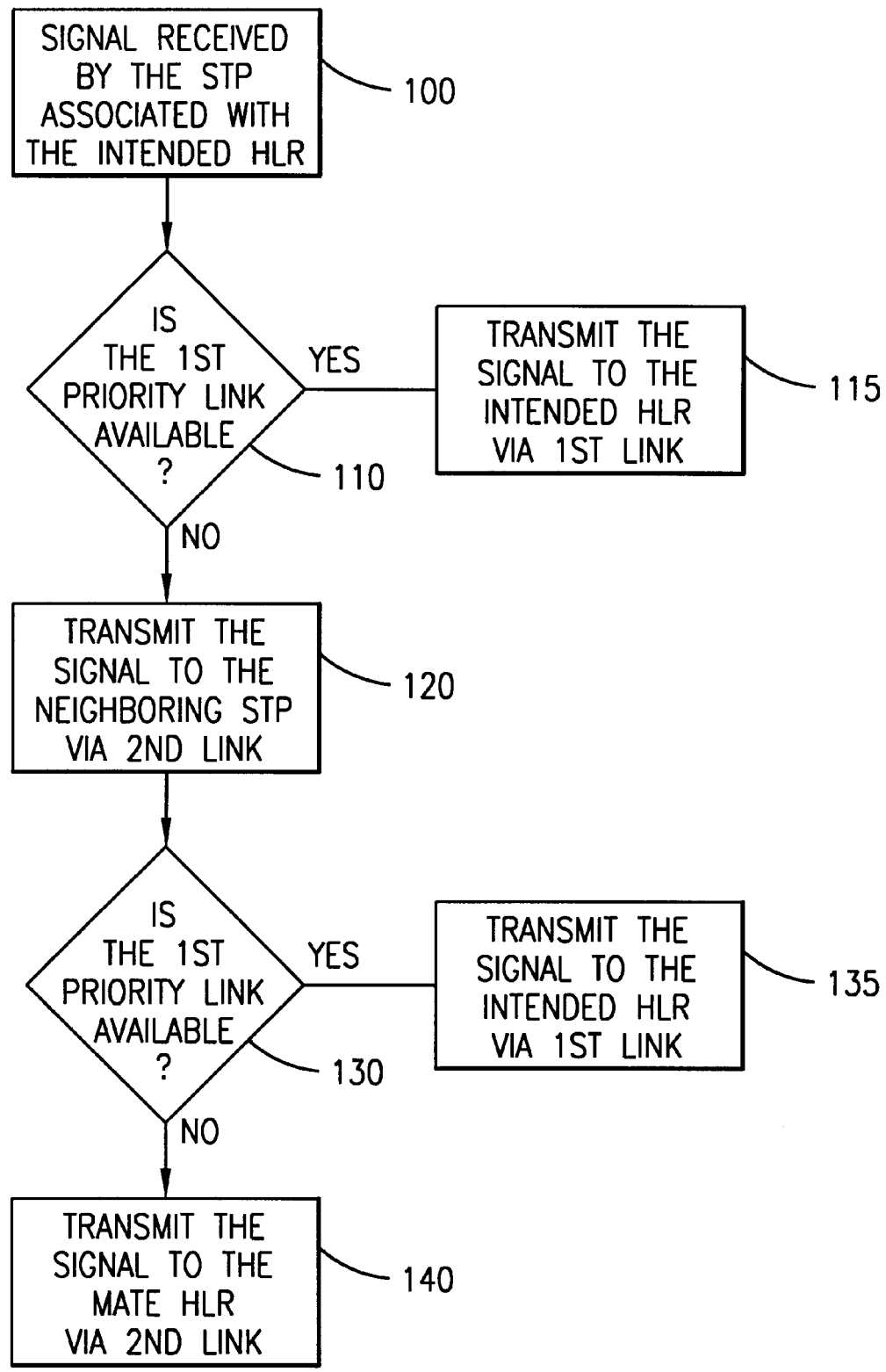
FIG. 5 is a flowchart illustrating the steps taken in accordance with the teachings of the present invention to route incoming signals toward a pair of HLRs.

The operation of this system in accordance with Table 1 may be better understood with reference to a specific example where a signal intended for HLR1 is received by STP1. Accordingly, FIG. 5 is a flowchart illustrating the steps for routing incoming signals toward an HLR1 via STP1. If a signal destined for HLR1 with 1-2-1 as the destination address is received by the STP1 270A at step 100, using the priority column of Table 1, it is first determined whether the link specified by the priority one link entry is operable at step 110. If L1 in FIG. 4, which is specified as the priority one link, is operable, the received signal is transmitted from the STP 270A to the HLR1 10A via L1 at step 115. However, if link L1 is inoperable, instead of using L2 as shown in FIG. 4 to reroute the received signal from the STP1 270A to the HLR2 10C, another attempt is made to route the signal to the originally intended HLR1 10A. In accordance with the second priority link entry in table 1, the STP1 270A reroutes the received signal to the STP2 270B via L5 at step 120. Once the signal is received by the STP2 270B, STP2 also checks if its first priority link L3 is operable at step 130. If the link connecting to HLR1 is useable, then the received signal is sent to the originally intended HLR1 10A via L3 at step 135. This ensures that all signals intended for HLR1 are routed to HLR1 unless HLR1 itself or both links to HLR1 are down and inoperable. Finally, if all links to the intended HLR1 are inoperable, the second priority link L4 is used to transmit the received signal from the STP2 270B to the mate HLR2 10B at step 140 (as illustrated by the sixth row of the LS column in Table 1). Once the signal is received by the mate HLR2 10B, the HLR2 10B compares its own capability code #1 (CC1) with the destination point code specified by the received signal and determines whether it is compatible to support and service such a signal. If there is a match, HLR2 processes the signal with subscriber information that has been previously duplicated from HLR1.

The same double checking procedures are followed for signals intended for HLR2. Signals are first received by the STP2 270C associated with HLR2. If the first priority link L4 is operable, the received signal is transmitted directly to HLR2. However, if link L4 has failed, incoming signals intended for the HLR2 10B are rerouted to the STP1 270A by the associated STP2 270B over link L5. The STP2 270A once again attempts to route the received signal to the originally intended HLR2 10B via link L2. If L2 is also down, the signal is rerouted to the mate HLR1 for support via link L1.

Accordingly, HLR1 and HLR2 fully support each other in case the other has failed. Signals intended for a failed HLR are automatically rerouted to the failed party's mate and transparently handled without service interruption to the servicing mobile subscribers. Because the rerouting is done by an associated pair of STPs, there is no need for a separate communication link connecting the two HLRs directly. Henceforth, the existing SS7 telecommunications network is utilized with minor modifications to implement the present system.

The second capability code (CC2) within each HLR is used between an associated pair of HLRs to communicate with each other. While communicating between a first HLR and a second HLR to duplicate the subscriber data, it is not functional to use the HLRs' own SPC addresses. In the originating node, the Message Transfer Part (MTP) layer of the SS7 telecommunications network will not route the message towards the mate HLR if the Destination Point Code (DPC) associated with the transmitted signal is either not defined in the network or already defined as one of its own capability codes. Henceforth, if the signal is transmitted using from the HLR1 to the HLR2 using the HLR2's SPC address as the destination point code, since the HLR2's SPC address is the same as the capability code #1 (CC1) associated with the HLR1, the MTP layer will refuse to route the signal assuming that the signal is intended for itself. Conversely, for the receiving end of the transmitted signal, even if the signal is delivered from the HLR1 to the HLR2, the MTP layer for the HLR2 will also discard the signal since the originating point code (OPC) associated with the received signal is also equal to its capability code #1. Consequently, the signal is discarded because the MTP layer assumes that the signal must have been originated from itself.

Accordingly, a different addressing mechanism is needed to ensure that the network can distinguish signals intended for HLRs over the network from signals intended for each other for updating subscriber information. As a result, CC2 is used to identify a pair of HLRs within the SS7 telecommunications network and used only to communicate packet information between the associated pair of HLRs. Accordingly, when transmitting a signal from the HLR1 to HLR2, the CC2 associated with the HLR2 is used as the destination point code. Furthermore, in order to facilitate the proper return of a return message from the HLR2 to the HLR1, while transmitting the update signal from the HLR1 10A to the HLR2 10B, the CC2 associated with the HLR1 is used as the origination point code (OPC). The CC2 value assigned to the HLR1 is utilized to enable the MTP layer for the HLR2 10B to recognize and properly deliver a return message using the received OPC value as the DPC parameter.

Furthermore, by providing separate entries for CC2s within associated STPs, a separate signaling and addressing scheme can be utilized to transport signals between mate HLRS. By maintaining separate entries within the STPs, the network is able to distinguish signals intended for HLRs received over the network from signals intended for each other for updating subscriber information.

Figure 6:
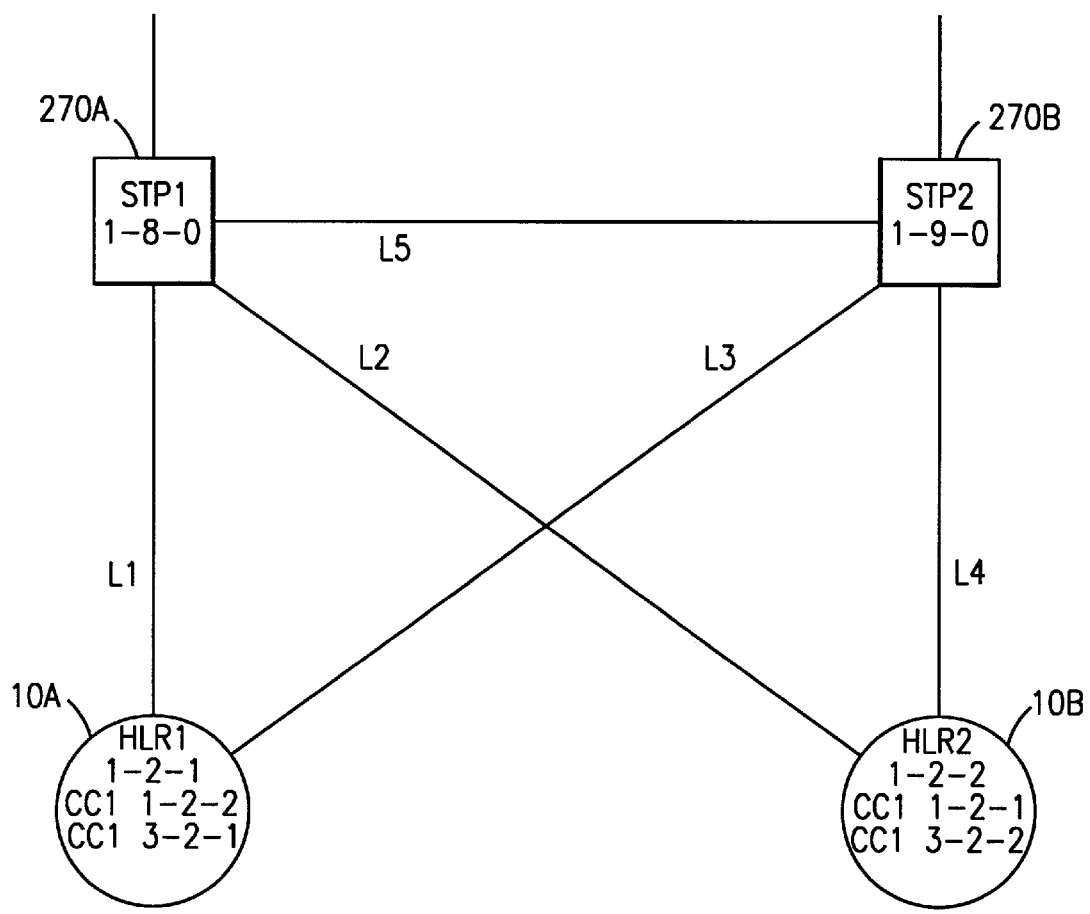
FIG. 6 is a diagram illustrating the communications links used by the SS7 telecommunications network to route signals to and from the dual HLRs.

Now referring to FIG. 6, there is shown a diagram illustrating the communications links used by the SS7 telecommunications network to route signals between a pair of HLRs utilizing CC2. The HLR1 10A has the CC2 value of 3-2-1, and the HLR2 10B has the CC2 value of 3-2-2. Therefore, in order for the HLR1 10A to transmit signals to the HLR2 10B, instead of using HLR2's SPC value of 1-2-2, the CC2 value of 3-2-2 is used. The following illustrative table is then used to route signals appropriately between the two HLRS:

TABLE 2

| Node | Destination | Priority | LS | Route |
|------|-------------|----------|----|----|
| STP1 | 3-2-1 | 1 | L1 | 1-2-1 |
|  |  | 2 | L5 | 1-9-0 |
| 1-8-0 | 3-2-2 | 1 | L2 | 1-2-2 |
|  |  | 2 | L5 | 1-9-0 |
| STP2 | 3-2-1 | 1 | L3 | 1-2-1 |
|  |  | 2 | L5 | 1-8-0 |
| 1-9-0 | 3-2-2 | 1 | L4 | 1-2-2 |
|  |  | 2 | L5 | 1-8-0 |
| HLR1 | 3-2-2 | 1 | L3 | 1-9-0 |
|  |  | 2 | L1 | 1-8-0 |
| HLR2 | 3-2-1 | 1 | L2 | 1-8-0 |
|  |  | 2 | L4 | 1-9-0 |

In order to duplicate each other's subscriber data, signals can be transmitted via four different link paths from one HLR to the other providing the same reliability and robustness mentioned above. As an illustration using FIG. 6, signals transmitted by the HLR1 10A can be routed through a L3-L4 link path to the HLR2 10B. If L3 is inoperable, the signals can be routed through a L1-L2 link path to the HLR2 10B. If L4 is inoperable, a L3-L5 -L2 link path to the HLR2 10B can further be utilized to deliver the signal from the HLR1 10A to the HLR2 10B. Lastly, if L2 is inoperable, a L1-L5-L4 link path can be utilized to deliver the signal from the HLR1 10A to the HLR2 10B.

Figure 7:
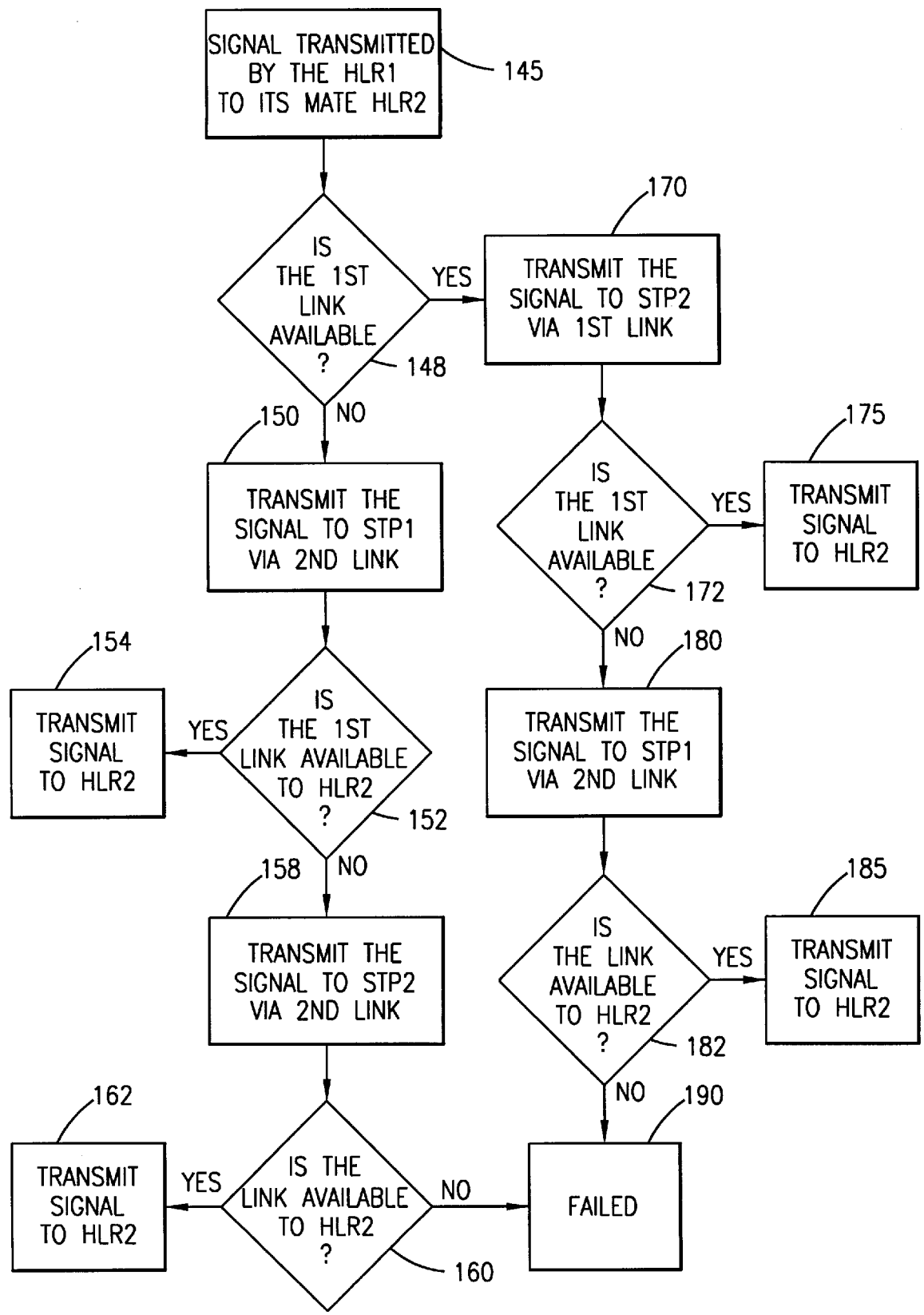
FIG. 7 is a flowchart illustrating the steps taken in accordance with the teachings of the present invention to communicate subscriber data between the first HLR and the second HLR.

Again, the operation of this system in accordance with Table 2 may be better understood with reference to a specific example where HLR1 transmits a signal to its mate HLR2. Accordingly, FIG. 7 is a flowchart illustrating the steps taken in order to route signals from HLR1 to HLR2. When the HLR1 10A transmits a signal to update subscriber information within the HLR2 10C, 3-2-2 which represents the CC2 value for HLR2 is used as the destination point code at step 145. Pursuant to the third row of the Node column and the ninth row of the priority column in Table 2, it is determined whether the first priority link L3 is operable at step 148. If L3 is operable, the signal is sent to the STP2 270B as represented by the SPC value of 1-9-0 at step 170. However, if the first priority link L3 is inoperable, according to the next priority entry, the signal is sent to the STP1 270A as represented by the SPC value of 1-8-0 at step 150. After the signal is received by STP1, the first row of the Node column in Table 2 is referenced. From the STP1 270A, another attempt is made to directly route the received signal to the HLR2 10C as represented by the SPC value of 1-2-2 in the first row of the priority column of Table 2. Accordingly, it is determined whether the first priority link L2 for STP1 is operable at step 152. If L2 is operable, STP1 transmits the received signal directly to the HLR2 10C over the L2 link at step 154. However, if the L2 link is inoperable, the received signal is rerouted to the STP2 270B as specified by the second priority link entry for 3-2-2 at step 158. From the STP2 270B, a final attempt is made to route the signal to the originally intended HLR2 10C at step 160. If the first priority link L4 for STP2 is operable, the signal is transmitted to HLR2 via L4. However, if the first priority link to the HLR2 10C is also inoperable, the delivery fails.

The second priority link specified in row 2 for the 3-2-2 entry is not utilized since transmitting over the second priority L5 link would merely send the received signal right back to the same STP1 370A. The system already knows that the signal itself was received from the STP1 370A and there is no reason to send the signal back to STP1. If the signal was returned back to STP1, the original sender, the signal can be looped infinitely between the two STPs.

Going back to step 170 where the signal was transmitted from HLR1 to STP2, it is further determined whether the first priority link L4 for STP2 is operable at step 172. If L4 is operable, the STP2 170B transmits the received signal directly to the intended destination HLR2 10C at step 175. However, if the first priority link L4 is inoperable, the STP2 270B similarly reroutes the received signal to the STP1 370A via L5 as specified by the second priority link entry for STP2 in Table 2 at step 180. At step 182, another attempt is made to transmit the received signal to the HLR2 10C. If the first priority link L2 is also inoperable, then the delivery of the signal has failed (step 190). However, if L2 is operable, the received signal is transmitted from the STP1 370A to the HLR2 10C at step 185. HLR2 updates its database with the contents from the received signal. Accordingly, the HLR1 subscriber information is duplicated at HLR2. By utilizing CC2 along with the prioritized link sets referenced in Table 2, signals are communicated between the two HLRs.

Data received by any one of the two mated HLRs are communicated to the other HLR in a manner described above as long as both HLRs are operable. However, if one HLR fails and is inoperable, the other HLR taking over the failed HLR's operation also needs to stop transmitting update signals to the failed HLR. In order to determine the status of each other and to prevent update signals from being transmitted to the failed mate HLR, each HLR periodically transmits a signal to the mate HLR (hereinafter referred to as a heartbeat signal). The transmitted heartbeat signal from the first HLR to the mate HLR has a corresponding response signal. If the expected response signal from the mate HLR is not received by the first HLR, the first HLR assumes that the mate HLR is temporarily inoperable. If the mate HLR fails to respond to further heartbeat signals, the status of the mate HLR is upgraded to inoperable. Accordingly, depending on the number of heartbeat signals not responded by the mate HLR, the first HLR assigns a different level of status to the mate HLR. Such status includes:

Healthy: both HLRs are unaware of any problems;
Communications Difficulties: communication difficulties are being experienced with the mate HLR;
Mate Gone: communications with the mate HLR have become difficult for a long enough period that the mate HLR is considered to be semi-permanently unreachable;
Own Reload Restart: this HLR has experienced a system restart with reload (where the system reloads all its data from a secondary storage medium);
Own Other Failure: this HLR has experienced a failure other than reload;
Partner Reload Restart: the status information received in the mate HLR's heartbeat signaling indicates that it has experienced a restart with reload;
Partner Other Failure: the status information received in the mate HLR's heartbeat signaling indicates that it has experienced a failure type other than a restart with reload; and
Out of Service: this HLR has been manually removed from service.

When an HLR that has been unavailable (i.e., inoperable) to the network becomes available, the recovering HLR will not be up-to-date with information for all its subscribers. It is therefore important that this HLR not start processing network requests until the HLR has been updated with information from the other HLR. This is to minimize incorrect processing of network requests. Therefore, in order to prevent the network from directing network requests back to the recovering HLR, directly after becoming available again, the recovering HLR must present itself as still being inoperable to the network. At the same time, the recovering HLR must also communicate with the other HLR in order to update its database with missing subscriber information.

In accordance with the teachings of the present invention, the recovering HLR is updated alongside the mate HLR for a period of time until the data that was missed during the outage are superseded by new data entering the recovering HLR in the form of duplicated traffic requests. As mentioned previously, as far as the network is concerned, the recovering HLR is still unavailable, and the recovering HLR will only process updating signals from the mate HLR and will not interact with the network.

The time period for updating the recovering HLR is manually predefined by the network operator for each status category. After such an updating period expires, the recovering HLR makes itself available to the network again and both HLRs are once again fully supporting each other. Note that in the situation where an HLR fails over a busy period of network requests and recovers after such a period, the operator specifies a recovery period long enough to include the next busy period. This will ensure that the large volume of data that were missed during the failure are sufficiently updated by an equally large volume of updates superseding those that were missed.

By utilizing the two capability codes within each HLR, in accordance with the teachings of the present invention, the SS7 telecommunications network connecting a pair of HLRs is able to reroute incoming signals intended for a particular HLR to its mate HLR if the particular HLR or its connecting links are inoperable. By automatically and transparently rerouting these incoming signals, telecommunications service to mobile subscribers is uninterrupted. Furthermore, by utilizing an unique CC2 code within a pair of HLRs, a particular HLR is able to communicate its subscriber information to its mate HLR over the same SS7 telecommunications network used by the HLRs to provide telecommunications service to their subscribers. As a result, two HLRs are able to duplicate each other's data without requiring additional hardware or devices. Furthermore, whenever a particular HLR fails, no subscriber data are lost.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A cellular telecommunications system comprises:
   a first register storing data associated with a first plurality of subscribers;
   a second register storing data associated with a second plurality of subscribers;
   wherein said first register further including:
      a first signaling point code (SPC) representing a network address of said first register; and
      a second SPC representing a network address of said second register which said first register is duplicating, said second SPC used for comparison to a destination address specified by an incoming signal to determine whether to accept said incoming signal at said first register; and
   wherein said second register further including:
      a first SPC representing a network address of said second register; and
      a second SPC representing a network address of said first register which said second register is duplicating said second SPC used for comparison to a destination address specified by an incoming signal to determine whether to accept said incoming signal at said second register.

2. The system of claim 1 wherein said first register and said second register are connected nodes within a Common Channel Signaling (CCS) communications network and wherein said first register and said second register communicate with each other via said CCS communications network.

3. The system of claim 1 wherein said first register further has a third SPC used for communicating from said second register to said first register.

4. The system of claim 3 wherein said third SPC is utilized as an originating point code (OPC) when transmitting a signal from said first register to said second register.

5. The system of claim 4 wherein said signal comprises a heartbeat signal for determining the status of each register.

6. The system of claim 1 wherein said second register further has a third SPC used for communicating from said first register to said second register.

7. The system of claim 6 wherein said third SPC is utilized as an originating point code when transmitting a signal from said second register to said first register.

8. The system of claim 1 wherein said first register is a Home Location Register for storing subscriber information about said first plurality of subscribers.

9. The system of claim 1 wherein said second register is a Home Location Register for storing subscriber information about said second plurality of subscribers.

10. The system of claim 2 wherein said CCS communications network is a Signaling System No. 7 (SS7) communications network.

11. The system of claim 10 wherein said SS7 communication network further comprises:
   a first Signal Transfer Point (STP) servicing said first register, said first STP comprising an address conversion table for routing signals received from and terminating toward said first register; and
   a second Signal Transfer Point (STP) servicing said second register, said second STP comprising an address conversion table for routing signals received from and terminating toward said second register.

12. A system for reliably providing cellular telecommunications service to a plurality of subscribers within a telecommunications network, said system comprising:
   a first register connected to said telecommunications network, wherein said first register stores subscriber information regarding said plurality of subscribers;
   a second register connected to said telecommunications network, wherein said second register duplicates data contents of said first register; and
   said second register further including:
      a first signaling point code (SPC) for accepting incoming signals intended for said second register if said second register is operable; and
      a second SPC for comparison to a transmitted signaling point code in an incoming signal to determine whether to accept said incoming signal at said second register if said first register is inoperable.

13. The system of claim 12 wherein said second register further includes a third SPC for accepting signals containing subscriber data transmitted from said first register.

14. The system of claim 13 wherein said third SPC is utilized as an originating point code when transmitting a signal from said second register to said first register.

15. The system of claim 14 wherein said signal comprises a heartbeat signal for determining the status of each register.

16. The system of claim 12 wherein said first register is a Home Location Register for storing mobile subscriber information about said plurality of subscribers.

17. The system of claim 12 wherein said second register is a Home Location Register.

18. The system of claim 12 wherein said first register and said second register are connected via a Common Channel Signaling (CCS) telecommunications network.

19. The system of claim 18 wherein said CCS telecommunications system is a Signaling System No. 7 (SS7) communications network.

20. The system of claim 19 wherein said SS7 communications network further comprises a Signaling Transfer Point (STP) servicing said second register, said STP comprising an address conversion table for prioritizing and routing signals received from and terminating toward said second register.

21. A method of reliably providing cellular telecommunications service to a mobile subscriber within a telecommunications network, said telecommunications network comprising a first database register and a second database register connected via a Common Channel Signaling (CCS) network, said method comprising the steps of:
   receiving a signal at a first Signal Transfer Point (STP) associated with said first database register;
   if a first link between said first STP and said first database register has failed then:
      routing said signal to a second STP;
      if a second link between said second STP and said first database register is operable, routing said signal from said second STP to said first database register; and
   if said second link is inoperable:
      routing said signal from said second STP to said second database register;

comparing a destination address specified by said signal with a first Signal Point Code (SPC) stored within said second database register; and processing said signal if there is a match;

otherwise, routing said signal from said first STP to said first database register.

22. The method of claim 21 wherein said step of routing said signal from said first STP to said first database register further comprises the steps of:

determining that said signal needs to be copied over to said second database register; and transmitting said signal towards said second database register with a second Signaling Point Code (SPC) representing said second database register.

23. The method of claim 22 wherein said step of determining that said signal needs to copied over to said second database register further comprises the step of transmitting a heartbeat signal for determining the status of each database register.

24. The method of claim 22 wherein said step of transmitting further comprises the steps of:

transmitting said signal from said first database register to said second STP using said second SPC representing said second database register as a destination address;

determining whether a third link between said second STP and said second database register has failed; and if said third link has failed then:

routing said signal to said first STP associated with said first database register;

determining whether a fourth link between said first STP and said second database register is operable; and if said fourth link is operable, routing said signal from said first STP to said second database register;

otherwise, routing said signal from said second STP to said second database register.

25. The method of claim 24 wherein said step of transmitting said signal from said first database register to said second STP further comprises the step of using a second SPC representing said first database register as an originating point code (OPC).

26. The method of claim 21 wherein said first database register and said second database register are Home Location Registers (HLRs) within said cellular telecommunications network.

27. A system of reliably providing cellular telecommunications service to a mobile subscriber within a telecommunications network, said telecommunications network comprising a first database register and a second database register connected via a Common Channel Signaling (CCS) network, said system comprising:

means for receiving a signal at a first Signal Transfer Point (STP) associated with said first database register;

means for determining whether a first link between said first STP and said first database register has failed; and if said first link has failed then:

means for routing said signal to a second STP;

means for determining whether a second link between said second STP and said first database register is operable; and if said second link is operable, means for routing said signal from said second STP to said first database register; and if said second link is inoperable:

means for routing said signal from said second STP to said second database register;

means for comparing a destination address specified by said signal with a first Signal Point Code (SPC) stored within said second database register; and means for processing said signal if there is a match;

otherwise, means for routing said signal from said first STP to said first database register.

28. The system of claim 27 wherein said means for routing said signal from said first STP to said first database register further comprises:

means for determining that contents of said signal need to be copied over to said second database register; and means for transmitting said signal towards said second database register with a second Signaling Point Code (SPC) representing said second database register.

29. The system of claim 28 wherein said means for determining that contents of said signal need to be copied over to said second database register further comprises means for determining that status of each database register.

30. The system of claim 29 wherein said means for determining said status comprises a heartbeat signal transmitted between said first database register and said second database register.

31. The system of claim 28 wherein said means for transmitting further comprises:

means for transmitting said signal from said first database register to said second STP using said second SPC as a destination address;

means for determining whether a third link between said second STP and said second database register has failed; and if said third link has failed then:

means for routing said signal to said first STP associated with said first database register;

means for determining whether a fourth link between said first STP and said second database register is operable; and if said fourth link is operable, means for routing said signal from said first STP to said second database register;

otherwise, means for routing said signal from said second STP to said second database register.

32. The system of claim 27 wherein said first database register and said second database register are Home Location Registers (HLRs) within said cellular telecommunications network.

33. A method of reliably providing cellular telecommunications service to a mobile subscriber within a telecommunications network, said telecommunications network comprising a first database register and a second database register, said method comprising the steps of:

receiving a signal intended for said first database register over said network;

determining whether said first database register is operable;

if said first database register is operable:

routing said signal towards said first database register;

comparing a first capability code with a destination address associated with said signal;

if there is a match:

processing said signal; and transmitting said signal towards said second database register using a second capability code if contents of said signal need to be copied over to said second database register; and if said first database is inoperable:
rerouting said signal towards said second database register;
comparing a third capability code with said destination address associated with said signal; and
processing said signal if there is a match.

34. The method of claim 33 wherein said step of determining whether said first database register is operable further comprises the steps of:

determining whether a first link between a first signal transfer point (STP) associated with said first database register and said first database register is operable; and if said first link is inoperable:
rerouting said signal to a second STP associated with said first database register; and
determining whether a second link between said second STP and said first database register is operable.

35. The method of claim 33 wherein said step of transmitting said signal towards said second database register using said second capability code further comprises the steps of:

determining whether said second database register is operable; and if said second database register is operable:
transmitting said signal to said second database register; otherwise, discarding said signal.

36. A method of reliably providing cellular telecommunications service to a mobile subscriber within a telecommunications network, said telecommunications network comprising a first database register and a second database register, said method comprising the steps of:

receiving at said second database register a signal intended for said first database register over said network when said first database register is inoperable;

comparing a first signaling point code (SPC) stored at the second database register with a destination address specified by said signal; and processing said signal if there is a match between the first SPC and the destination address.

* * * * *